April 30, 1957 A. BOSCHI 2,790,650
PNEUMATIC LOAD-RESPONSIVE SPRING SUSPENSION FOR VEHICLES
Filed Feb. 6, 1956 3 Sheets-Sheet 1

United States Patent Office 2,790,650
Patented Apr. 30, 1957

2,790,650

PNEUMATIC LOAD-RESPONSIVE SPRING SUSPENSION FOR VEHICLES

Antonio Boschi, Milan, Italy, assignor to S. A. G. A. S. p. A., Milan, Italy

Application February 6, 1956, Serial No. 563,736

Claims priority, application Italy February 22, 1955

3 Claims. (Cl. 280—124)

This invention relates to suspensions for vehicles of the type comprising pneumatic springs in combination with helical mechanical springs.

As it is well known, any spring type has its inherent partly favorable partly unfavorable characteristics. So, for instance, metallic helical springs have in their field of use rectilinear characteristics, that is, the deflections are proportional to load. These characteristics of metallic springs therefore lead to a considerable difference in level of the vehicle under idle running and full load, respectively, more particularly when the ratio between the vehicle's own weight and load to be transported is a considerable one, such as, for instance, in tank vehicles or motor busses.

Pneumatic springs have rectilinear characteristics too but afford the advantage over metallic springs of an easy adjustment of their characteristics through a suitable adjustment of internal pressure. A drawback of such pneumatic springs resides in the necessity of maintaining therein a fluid pressure even during inoperative periods to prevent collapsing of the suspension. A further drawback resides in the fact that the casing of a pneumatic spring is easily damaged, so that elaborate structures must often be resorted to, which make the spring unacceptable for instance from the point of view of cost. Attempts have previously been made to eliminate said drawbacks by arranging in the pressure chamber of a pneumatic spring a metallic safety spring, intended to assist the pneumatic spring in the case of overload or damage to the pneumatic system. Reference is made in this connection to U. S. Patent 2,192,355 to John W. Kuhn.

Finally, it is known to connect the pressure chambers of individual pneumatic springs of a suspension with a source of pressure fluid, such as compressed air and interpose in the connecting pipes at least one valve or cock in order to adjust the fluid flow to the pressure chambers in accordance with the load carried by the vehicle.

As distinct from the state of the art referred to above, a first object of this invention is to provide a suspension of the abovementioned type having an improved easily adjustable characteristic.

A second object of this invention is to provide a suspension of the type referred to above, in which the characteristic is curvilinear instead of rectilinear, this resulting in a variable flexibility suspension.

A further object of this invention is to provide a suspension of the type referred to, in which at least one of the resilient means employed also acts as a shock absorber.

Still a further object of this invention is to provide a suspension of the type referred to, in which the pneumatic springs are functionally and structurally combined with the helical mechanical springs without detrimentally affecting economy and ease of manufacture and assembly.

Still a further object of this invention is to provide a suspension of the type referred to, in which the combined mechanic-pneumatic structure is of considerable strength against internal pressures and external loads through a special configuration and arrangement of its component parts.

Finally, a still further object of this invention is to provide a suspension of the type referred to which fully obviates the above mentioned drawbacks.

All these objects and advantageous features of this invention will be understood from the appended description reference being made to the accompanying drawing given by way of a non limiting example only, wherein.

Figure 1:
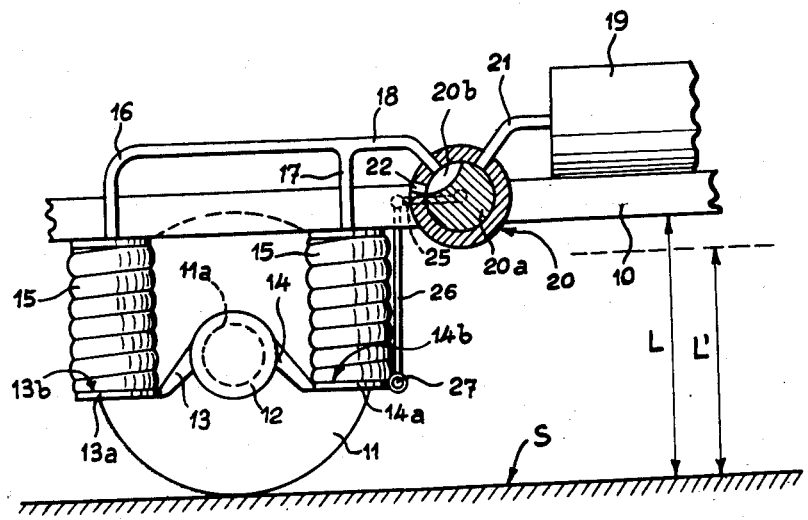
Figure 1 is a diagrammatical side view of a suspension of the type specified used in connection with a railway vehicle.

In the drawing, 10 indicates a horizontal suspended component part of a railway vehicle, such as the frame of a bogie or the actual frame of the railway car, which will be referred to hereafter merely as "frame." One vehicle wheel is denoted by 11, the adjacent end of its associated axle 11a being rotatably mounted in the conventional axle box 12 which is vertically guided in a manner known per se and therefore not shown on the drawing between vertical guides securely fixed to the frame 10. The axle-box 12 is specifically intended to represent a structural member, known per se, of a suspension designed to connect the vehicle axle with its associated springs. In any other vehicle, this axle box is constituted, for instance, by the outer race ring of a bearing or the like, the term "axle-box" employed in the claims should not therefore be construed in a restrictive sense, but should be understood to cover any equivalent member.

The axle box 12 has secured thereto on two opposite sides two bearing members 13, 14, respectively, said bearing members being generally in the form of tough brackets rigidly connected to the axle box 12 for instance by means of bolts. The two brackets each comprise portions 13a, 14a, respectively, each having a flat horizontal top face 13b, 14b, respectively. Two springs 15, 15 are interposed between the faces 13b, 14b and frame 10, respectively. Said springs will be described in greater detail with reference to Figures 2 and 3. It may be seen already now that said springs each comprise a pressure chamber, the two pressure chambers connecting with conduits 16, 17, respectively, branched from a conduit 18. The conduit 18 can be connected with a compressed air source, such as a reservoir 19 through a valve 20 and a conduit 21 connecting the valve 20 with the reservoir 19 supported by the frame 10. The valve 20 is supported by the frame 10 and is generally a three-way valve or distributor, two ways being constituted by the conduits 18 and 21, the third one being merely a vent 22 bored in the valve housing 20 and opening to the outside. The valve 20 includes a valve member 20a, having machined in its periphery an approximately tangential notch 20b adapted to establish communication between the ways 18 and 22 in a certain angular position of the member 20a (as shown on the drawing) and between the ways 18 and 21 in another angular position not shown on the drawing. The ways 18 and 22 connect together through the notch 20b when the suspension merely carries the vehicle's own weight without any useful load, that is, when the frame 10 is at a level L with respect to the rolling track or rail S on which the wheel 11 rolls. On loading of the vehicle the frame 10 gradually sinks. As the frame 10 reaches a certain predetermined level L', the valve member 20a of the valve 20 rotates to said other angular position in which the notch 20b connects together the ways 18 and 21 and intercepts the way 22. To this end the valve member 20a has securely fixed thereto a lever 25 hinged to the top end of a connecting rod 26 pivotally attached at its lower end at 27 to the bracket 14a. As a result, the valve member 20a of the valve 20 is made responsive to relative vertical displacements of the axle box 12 and frame 10, that is, to variations in the level L of the frame. On sinking of the frame, the connecting rod 26 rotates the lever 25 and valve member 20a clockwise, thereby moving the member 20a from its said first position to said other position.

According to an essential condition for the purpose of this invention the movements of the valve member 20a should be delayed with respect to the vertical movements of the frame 10, so that the valve 20 is operative only in response to predeterminately slow relative movements between the frame 10 and axle box 12, said valve being ineffective in response to the faster and relatively shorter movements of said frame resulting from the operation of the vehicle over an uneven roadbed. For succinctness of this description the means for obtaining this manner of operation of the valve 20 shall not be described; however, it is pointed out that such means can be constructed and arranged in the manner as described and shown in U. S. Patent 2,670,201 to Edwin F. Rossman for "Control mechanism" or in any other equivalent manner. It will therefore be easily understood by experts in the branch that the means of supplying compressed air described herein is merely intended to illustrate one of the fundamental arrangements of the system according to this invention in which, when the vehicle is under determined static load conditions, the pressure chambers of the pneumatic springs connect with the outside, and in which when the vehicle is under other static load conditions, charged by a heavier load, the pressure chambers are connected with the compressed air source through a delayed-reaction valve. According to this invention, the first-mentioned load conditions correspond to an empty vehicle. It will therefore be obvious that the inherent structure of the valve 20 is not critical for the purposes of this invention and can be carried out in various forms, provided its function within the general scope of this invention is met. The connection 14—14a—26—25 between the axle box 12 and valve 20 has been given merely by way of illustration too, and can be replaced by any equivalent connection through which the pressure chambers in the springs 15, 15 are vented or connected with the compressed air source 19 depending upon whether the vehicle is empty or under increasing load, respectively.

Figure 2:
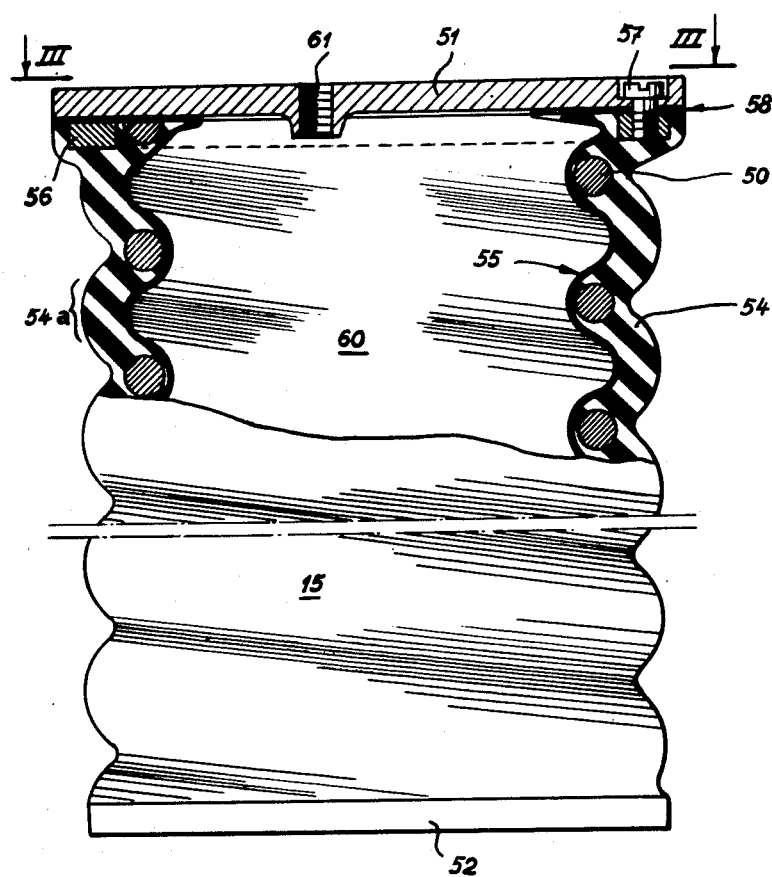
Figure 2 is a part sectional side view of a spring of the suspension shown in Figure 1.
Figure 3:
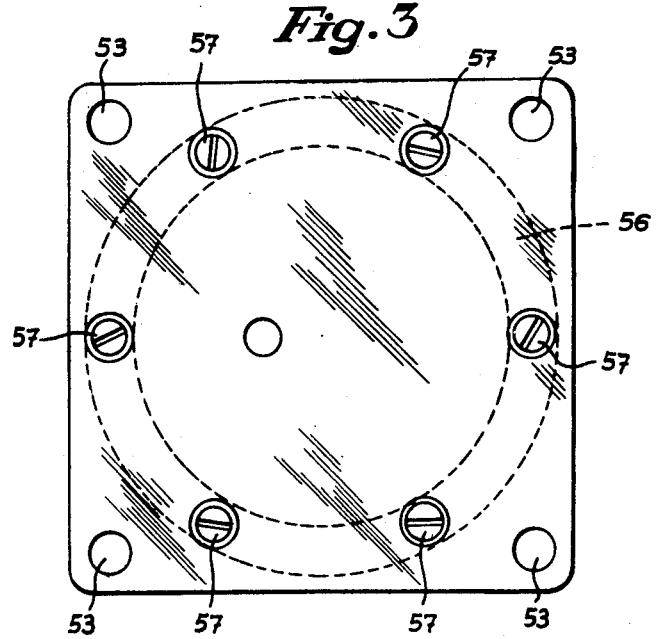
Figure 3 is a cross-sectional view on line III—III of Figure 2.

The particular structure of each spring 15, 15 is shown in Figures 2 and 3. In these figures, 50 denotes a helical steel spring, arranged between two end plates 51, 52, respectively, of generally square form. Said spring 50 is constantly under load, that is, it is axially compressed independently of the vehicle load conditions. Each end plate, 51, 52, has bored therein at its four corners holes 53 through which the plates 51, 52, respectively, can be bolted to the frame 10 and to the flat top face 13b or 14b of the associated bracket 13 or 14, respectively. The longitudinal geometrical axis of the spring therefore takes vertical position parallel with the direction of the displacements of the axle box 12 with respect to the frame 10. The helical spring 50 is fully embedded in an envelope 54 of rubber or similar elastomer, hereafter briefly referred to as rubber, of which the inner surface lined with a rubberised cloth 55. The lower end plate 52 of the spring 15 is attached to the envelope 54 by vulcanisation. Preferably, on manufacture of the spring 15 the plate 52 is deposited on the bottom of a suitable mold, whereupon the helical spring 50 and a core coated with cloth 55 are introduced into the mold and the rubber envelope 54 is then cast and vulcanised. A ring 56, for instance of steel is embedded in the top end of the rubber envelope 54 on its manufacture and encircles the steel spring 50 permitting the top end of spring 15 to be tightly secured to the plate 51 through a circular row of bolts 57 extending through corresponding holes in plate 51 and screwed into tapped holes in the ring 56. A seal against pressure fluid between the plate 51 and spring 15 is insured by a gasket 58, for instance of rubberised cloth. The spring 15 inclusive of its end plates 51, 52 therefore confines a chamber 60, previously referred to as pressure chamber, adapted to be connected with either conduit 16, 17 (Figure 1) through a connecting hole 61 bored in the plate 51.

As shown in Figure 2 the rubber envelope 54 surrounds all over every turn of the helical spring 50, so that the helical spring 50 constitutes in respect of the envelope 54 an anchoring means which is extraordinarily efficient against expansion of the envelope in a radial direction when the chamber 60 is subjected to pressure by compressed air. This attachment is made still safer by the layer 55 of rubberized cloth which prevents tearing off the envelope 54 from the turns of the spring 50 under the action of compressed air and, on the other hand avoids bulging under pressure of the envelope portions between the individual turns, such as the portion referred to by 54a. It is further pointed out that the wall thickness of the envelope 54 is relatively a substantial one, appreciably exceeding the diameter of the round steel rod of which the helical spring 50 is made. Consequently, the envelope 54 behaves like a rubber spring having a curvilinear characteristic. It is known, in fact, that in a rubber spring the limit of proportionality between the deflection and load is a very low one, the wall becoming beyond said limit a variable flexibility spring. Moreover, said variable flexibility combines with the inherent hysteresis of rubber, so that, as it is well known, the spring acts in addition as a shock absorber.

According to an essential characteristic of this invention the spring 15, which may be termed a compound rubber-steel spring, is made of a size such as to be capable of supporting alone its respective fraction of the vehicle net weight, with a possibly satisfactory flexibility under said conditions. It will therefore be seen that my improved suspension is not dangerously affected, for instance by a damage to the compressed air supply means.

Operation of my improved suspension will now be explained with reference to Figures 1 and 4 of the drawing.

First of all, it should be noted that under minimum load conditions the suspension merely supports the net vehicle weight, each compound steel-rubber spring having allotted thereto a given fraction of said weight. Assuming the characteristic of the steel spring 50 is represented by the straight line O—A in Figure 4, under minimum load conditions said spring alone would undergo a deflection O—a. On the other hand, assuming the characteristic of the rubber spring 54 is represented by the curve O—B in Figure 4, the characteristic of the compound steel-rubber spring takes the form of curve O—C so that, under minimum load conditions, the deflection will be O—a'. Similarly, while on going over from minimum to maximum load the steel spring alone should undergo a further deflection beyond the value a, which is often excessive, inasmuch as it entails a considerable sinking of the frame 10, under the same conditions the compound spring 50—54 merely undergoes a further deflection a'—b', which entails a small reduction only of the primitive level L of the frame 10. It will moreover be seen that, under minimum load conditions, the position of the valve 20—20a is as shown in Figure 1, in which the pressure chambers of the springs 15 are connected with the outside through the passage 22 so that, as long as the load on each spring ranges right around the minimum load, the characteristic of the suspension is given by the portions of the curve O—C adjacent on both sides the point M in Figure 4.

I assume now the vehicle is gradually loaded, whereby the the frame 10 starts sinking down towards the level L'. The valve member 20a of the valve is then gradually rotated clockwise till it intercepts the connection 18—20b—22, whereafter it gradually opens the path 18—20b—21—19. Assuming now failure of the compressed air equipment including the reservoir 19 for any reason whatever, the characteristic of the suspension is nevertheless still represented by the curve O—M—C so that, under a maximum load, deflection will be at the utmost O—b'. It is therefore obvious that, as distinct from known constructions, my improved suspension is not critically affected by any damage to its associated pneumatic equipment.

However, if the equipment is efficient, the characteristic of a pneumatic spring generally should first of all be considered. As it is well known, this characteristic consists of a straight line, of which the position in a load-deflecting diagram depends inter alia upon the initial pressure of the air enclosed by the pressure chamber of the spring and the volume of said chamber.

Figure 4:
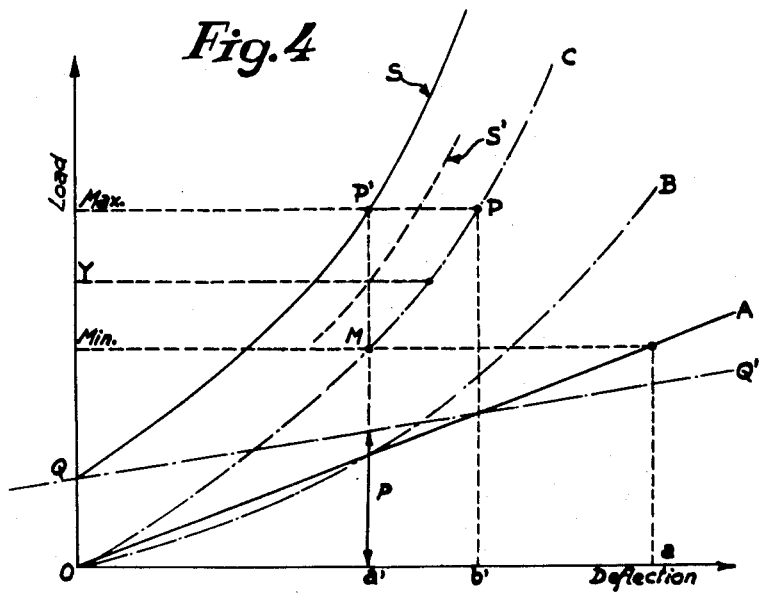
Figure 4 is an explanatory diagram.

Therefore, if the compressed air equipment is efficient, a straight line appears in the diagram of Figure 4, of which the position and inclination depend upon the load conditions which affect the valve 20. The ordinates of the various points of said straight line will sum up with those of the corresponding points on the curve O—C to give the characteristic curve of the suspension under said load conditions.

With a view to illustrating this principle, an extreme case will be considered, in which the vehicle is loaded to maximum load. In the absence of air pressure in the pressure chambers 60, these conditions would be represented in Figure 4 by the point P, the frame 10 sinking from the level L by an extent b'—a'. However, beginning with a critical level L' the valve 20 comes into action and connects then the conduit 18 to the conduit 21, so that compressed air is fed to the pressure chambers 60. This compressed air acts on the top plate 51 by an upwardly directed pressure tending to oppose lowering of the frame 10 as the latter is being loaded to its maximum load. At the limit the air pressure on the plate 51 takes a value p such that the frame 10 approximately resumes its primitive level L. The segment a'—b' in Figure 4 is thereby annulled so that the conditions reached by springs 15 are now represented by point P'. The segment P'—M' equals the value p plotted on the diagram at the abscissa a'. On reaching these conditions, the means 25, 26, 27 closes the valve 20. The top end of the segment p determines on the diagram in Figure 4 a point belonging to the characteristic straight line of the pneumatic spring constituted by the pressure chamber 60. The inclination of this straight line actually depends on the volume of chamber 60. By way of illustration this straight line is assumed to be positioned as indicated by Q—Q' in Figure 4. By adding the ordinates on said straight line to the ordinates on the curve O—C a curve S results, which extends through the point P' and constitutes the characteristic of the suspension according to this invention under maximum load conditions.

A similar procedure can be followed in connection with any load Y, for which the characteristic of the suspension is represented by a curve such as S'. By extending the demonstration generally, it will be clearly seen that on variation in load between the minimum and maximum load, a characteristic curve is obtained for each value, which belongs to a family of curves included between the curves S and O—C, the level of the frame 10 maintaining approximately its original value. The term "approximately" has been used here on account of the fact that the frame 10 actually stops at an intermediate level between L and L', the latter being the critical level for the start and end of the action of the valve 20. In fact, as a result of the delay in closing and opening of the valve 20, compressed air further flows to the chamber 60 for a certain period after the frame 10 has risen to the level L' without, however, reaching the level L.

The advantages and novel technical effects deriving from my invention will be understood by experts in the branch from the preceding description and illustration in Figure 4. However, a still more apparent demonstration can be supplied by the following practical example.

A suspension according to this invention has been incorporated in a 40-seater motor bus equipped with a compressed air braking mechanism at an air pressure of 6.5 atm. The compound rubber-steel spring (54—50) has been made such that its respective fraction of the vehicle dead weight was supported by 40% by the steel spring 50 and by the remaining 60% by the rubber spring 54. The valve 20 was constructed to be effective on exceeding 5% of the maximum load. Under middle load conditions, the frame 10 showed vertical oscillations of a total width of about 120 millimeters around its original level, with an air pressure in chamber 60 of 3 atm. To counteract deflection under maximum load, 4.5 atm. pressure were sufficient in chamber 60. Under maximum load and no air pressure, the suspension was still resilient enough for full tolerability by the occupants of the vehicle.

It will therefore be obvious that my improved suspension is not dangerously affected by damage to the pneumatic equipment and is in addition suitable for use in connection with vehicles equipped with a compressed air equipment at relatively low pressure, such as a pneumatic brake mechanism, while prior constructions necessitated considerably higher pressures, which are difficult to obtain by simple means and a low power consumption.

In designing a suspension of the type described it should be borne in mind that the best operating conditions are fulfilled when the rubber spring 54 is 1.5–2 times as strong as the steel spring 50. In other words, considering operation of the compound rubber-steel spring 54, 50 in the absence of air pressure in the chamber 60, for every 100 kgs. of the vehicle dead weight loading the spring, the steel spring should absorb about 33–40 kgs. while the rubber spring should absorb the remaining 67–60 kgs. Referring to the diagram in Figure 4, the above means that the straight line O—A should be less steep and the curve O—B should be steeper than shown on the drawing by way of illustration. The diameter of the compound spring will be calculated taking care of the difference between the minimum and maximum load, so that this difference can be absorbed by the total air pressure acting on the top plate 51 of the spring, without the specific pressure in the chamber 60 exceeding a predetermined limit, such as 4.5 atm. as indicated above. This clearly shows that, as distinct from known pneumatic suspensions, the rubber envelope 54 is not calculated on the basis of the maximum pressure in chamber 60, but simply as a rubber spring so as to obtain, jointly with the steel spring 50 a characteristic such as O—M—C in Figure 4. Considering the numerical relations between the steel-rubber springs as defined above, it may be safely relied upon that said rubber "spring-envelope" 54 further withstands the pressures occurring in operation in the chamber 60.

It should be noted that the envelope 54 as shown in Figure 2 is of undulated shape. The size of said undulations depends upon a number of factors, among which the most characteristic one resides in the fact that in normal operation the spring 15 undergoes deflections which all range around the abscissa a' in Figure 4 and never reach the value b', except in emergency cases. Therefore, while the axial extent of said undulations is implicitly given by the spacing of the convolutions of the steel spring 50, their radial extent is in any case small as compared with the diameter of the convolutions of the same spring 50. The undulations helically extending along the compound spring 15 are one of the essential characteristic features of this invention. In fact, it was ascertained that by employing in said suspension compound springs in which the envelope 54 was not undulated, the air pressures in the chamber 60, required for absorbing a certain given load, were greater than those ascertained with an undulated envelope. It was further found that, in the absence of undulations, the flexibility of the spring under maximum load and no air pressure in the chamber 60 was almost nil, while with an undulated envelope the flexibility was still satisfactory even under emergency conditions. For the purposes of this invention it is therefore preferred to employ as far as possible an envelope 54 of helically undulated configuration, substantially as illustrated.

While the embodiment of the present invention as herein disclosed constitutes a general form, it is to be understood that other forms might be adopted, all coming within the scope of the claims which follow.

What I claim is:

1. In a vehicle having a pneumatic load-responsive spring suspension including compressed air tank and a load-responsive delayed-reaction valve controlling air pressure within the spring, a pneumatic spring comprising: a helical metal spring in an axially compressed condition, an undulated rubber envelope within which the coil spring is embedded, said helical spring and said envelope jointly defining a rubber-metal spring; an end plate at each end of the helical spring, a metal ring at each end of the envelope, said ring being embedded within the envelope and encircling the adjacent end of the helical spring, and bolts securing the ring to the adjacent end plate whereby a pressure chamber is defined extending axially of the spring, said pressure chamber communicating with the said valve.

2. In a vehicle having a pneumatic load-responsive spring suspension including compressed air tank and a load-responsive delayed-reaction valve controlling air pressure within the spring, a pneumatic spring comprising: a helical metal spring in an axially compressed condition, an undulated rubber envelope within which the coil spring is embedded, said helical spring and said envelope jointly defining a rubber-metal spring with the metal spring supporting substantially 33–40% and the rubber spring supporting substantially 67–60% of the vehicle net weight relative to the said rubber-metal spring; an end plate at each end of the helical spring, a metal ring at each end of the envelope, said ring being embedded within the envelope and encircling the adjacent end of the helical spring, and bolts securing the ring to the adjacent end plate whereby a pressure chamber is defined extending axially of the spring, said pressure chamber communicating with the said valve.

3. In a vehicle having a pneumatic load-responsive spring suspension including compressed air tank and a load-responsive delayed-reaction valve controlling air pressure within the spring, a pneumatic spring comprising: a helical metal spring in an axially compressed condition, an undulated rubber envelope within which the coil spring is embedded, said helical spring and said envelope jointly defining a rubber-metal spring; an end plate at each end of the helical spring, a metal ring at each end of the envelope, said ring being embedded within the envelope and encircling the adjacent end of the helical spring, and bolts securing the ring to the adjacent end plate whereby a pressure chamber is defined extending axially of the spring, said pressure chamber communicating with the said valve; the said valve comprising a movable valve member controlling compressed air flow to and from the spring whereby the pressure chamber is vented in a minimum load condition of the vehicle and whereby the pressure chamber is connected to the tank in certain other load conditions of the vehicle.

References Cited in the file of this patent

UNITED STATES PATENTS

| | | |
|---|---|---|
| 2,605,099 | Brown | July 29, 1952 |
| 2,670,201 | Rossman | Feb. 23, 1954 |